PHOTOELECTRIC SWITCHING DEVICE FOR MECHANICAL SQUELCH

Filed Feb. 28, 1956

INVENTOR.
NATHANIEL BERCOVITZ, JR.
BY Marvin Moody
ATTORNEY 2,840,698
Patented June 24, 1958

2,840,698

PHOTOELECTRIC SWITCHING DEVICE FOR MECHANICAL SQUELCH

Nathaniel Bercovitz, Jr., Burbank, Calif., assignor to Collins Radio Company, Cedar Rapids, Iowa, a corporation of Iowa Application February 28, 1956, Serial No. 568,287

3 Claims. (Cl. 250—20)

This invention pertains to squelch systems for use in radio receivers and more particularly to mechanical squelch systems that utilize photoelectric devices.

In radio communication, undesirable noise is often received when strength of the carrier signal to which a radio receiver is tuned falls below a certain threshold level. Inadequate carrier signal for proper reception may be caused by interruption of carrier at the transmitter or by atmospheric fading. Squelch circuits may be included in radio receivers to disable certain receiving circuits when signal is inadequate for intelligible communication. Effective squelch control circuits must differentiate between random or non-repetitive signals which characterize noise, and repetitive signals which are used in transmitting intelligible signals. As described in United States Patent 2,710,943, issued to Melvin L. Doelz, when a repetitive signal is delayed, integrated, and then the delayed signal is multiplied by the undelayed signal, a direct current component is produced. However, when the received signal is of random, non-repetitive nature, direct current component is not produced. Through the use of the direct current component derived from repetitive signals, squelch control may be obtained.

An object of this invention is to provide improved apparatus for distinguishing between non-repetitive and repetitive signals.

Another object of the invention is to provide an improved squelch system that will positively disable receiver circuits when non-repetitive signals are being received.

A feature of the invention is the application of photoelectric principle to a squelch control system for providing positive cutoff when reception of adequate repetitive signals ceases.

Further features, objects and advantages of this invention will become apparent from the following description and claims when read in view of the drawings in which:

Figures 1, 2:
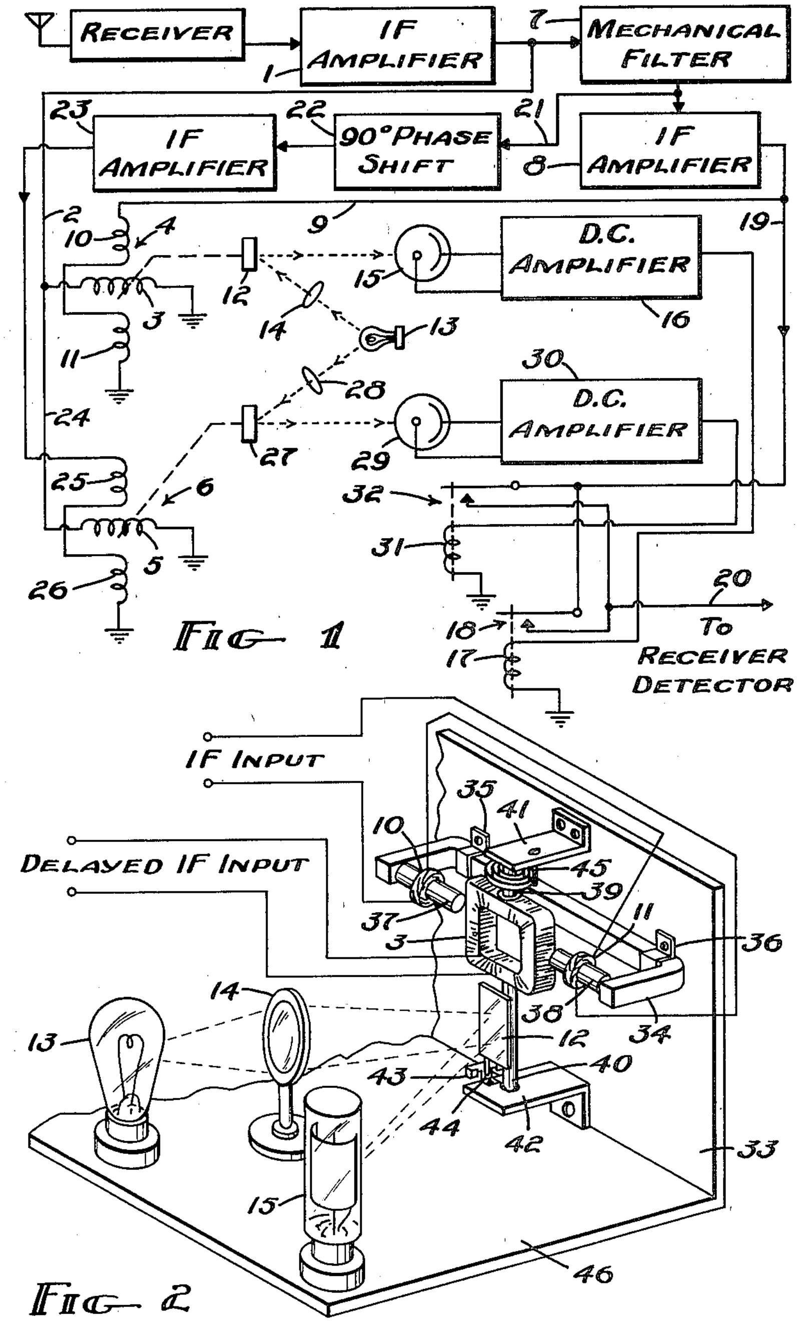
Figure 1 shows diagrammatically a photoelectric control system used in conjunction with radio receiver circuits, part of which are shown in block form.
Figure 2 shows in perspective a part of the photoelectric control system.

In general, the system shown in Figure 1 includes amplifier and filter circuits for applying delayed and undelayed signal to high frequency motors. Each motor has a rotor winding and a pair of field windings in an arrangement resembling that of a watt meter. These motors, or actuators, are arranged to rotate mirrors for controlling light beams that are to be focused on photoelectric cells. The photoelectric cells control operation of squelch relays. When repetitive signals are received, the relays operate to connect output of an I.-F. amplifier to receiver detector circuits.

More specifically, signal from receiver I.-F. circuits is applied through I.-F. amplifier 1, conductor 2 to rotor windings 3 and 5 of motors 4 and 6, respectively. In addition to being applied to the rotor windings, the output of the I.-F. amplifier 1 is applied through mechanical filter 7, I.-F. amplifier 8, conductor 9 to oppositely positioned stator windings 10 and 11 of motor 4. Phase characteristics of the mechanical filter 7 cause the signal that is applied to stator windings 10 and 11 to be delayed with respect to the signal that is applied to rotor winding 3. As explained in United States Patent 2,710,943, cited supra, when the input signal is repetitive, torque is developed for turning rotor 3 on its axis.

When a repetitive signal is being received, the rotor winding turns on a supporting shaft against meter spring tension until it contacts a stop. In this position of the shaft, mirror 12 is rotated from its normal position so that a beam of light from lamp 13 does not strike the sensitive portion of photoelectric cell 15. The photoelectric cell 15 which may be the usual germanium junction type, is connected to the input of a conventional direct current amplifier 16. The output of the amplifier is connected to winding 17 of a squelch relay. When the spot of light, as deflected by mirror 12, is not focused on the sensitive portion of photoelectric cell 15, an increase in current flow through relay winding 17 closes relay contacts 18. Closing of these contacts completes the circuit from I.-F. amplifier 8 through conductor 19 and contacts 18 to an output conductor 20 which is connected to input of receiver detector circuits. The receiver circuits are now enabled so that audio frequency signal is applied to a reproducing system.

When an incoming carrier signal fades or is discontinued for any reason so that the receiver does not intercept a repetitive signal, the rotor is no longer positioned against the meter spring but is returned to a normal stop position. Mirror 12 which is secured to the rotor shaft is then positioned for deflecting a beam of light from lamp 13 and focusing lens 14 to the sensitive portion of the photoelectric cell 15. An increase in current through the photoelectric cell causes a decrease in current through relay winding 17. The relay is released to open contacts 18 and thereby to disconnect the I.-F. amplifier from the received detector circuits so as to disable the receiver.

Under certain conditions the delay caused by the mechanical filter will produce phase shifts such that at certain frequencies there will be no rotation of rotor 3 even in the presence of a signal. To eliminate this malfunction a second signal control circuit including motor 6 has been added. This circuit is practically identical with that described above except that the part of the circuit for supplying I.-F. signal to the stator windings includes a 90° phase shift circuit.

I.-F. signal for the second control circuit is derived from the mechanical filter 7 and is applied through conductor 21 to the 90° phase shift circuit 22. From the phase shift circuit, the signal is applied through I.-F. amplifier 23 and conductor 24 to the oppositely positioned stator windings 25 and 26 of motor 6. As described for the operation of motor 4, when a repetitive signal is received, rotor 5 is operated off its normal position so that mirror 27 deflects a beam of light derived from lamp 13 and focusing lens 28 to one side of the sensitive portion of a second photoelectric cell 29. The input circuit of D. C. amplifier 30 is connected to photoelectric cell 29 and the output circuit is connected to squelch relay winding 31. When a spot of light, as directed by mirror 27, is focused to one side of the sensitive portion of photoelectric cell 29, the current flow through relay winding 31 as controlled by D. C. amplifier 30, increases to operate the relay. When the relay operates, contacts 32 are closed, and I.-F. signal from I.-F. amplifier 8 is applied to conductor 20. Since relay contacts 32 are connected parallel with relay contacts 18, operation of either relay 17 or relay 31 will enable the receiver.

A partial embodiment of the photoelectric control system is shown in Figure 2. Components are mounted on base 46 and upright panel member 33. The motor-operated light deflecting device includes rotor winding 3 and mirror 12. The magnetic circuit for use in conjunction with the rotor winding includes U-shaped yoke 34 and cores 37 and 38 which are positioned inwardly from opposite ends of the yoke. The yoke is fastened to the panel by brackets 35 and 36. Stator windings 10 and 11 are wound on cores 37 and 38, respectively. Rotor winding 3 is supported by axial shafts 39 and 40 in a closely spaced relationship between cores 37 and 38. The shafts are preferably pivoted on jewels which are mounted in brackets 42 and 41. The brackets are attached to the upright panel. Meter spring 45 is attached in a usual manner to the upper shaft 39 and to bracket 41 for maintaining the rotor in normal position. Mirror 12 and stop pin 44 are secured to the lower shaft. When the rotor is operated in response to the reception of repetitive signal, the stop pin 44 contacts stationary stop bracket 43 to determine the position of mirror 12. Lamp 13, focusing lens 14, and photoelectric cell 15 are fixed to base plate 46 in proper position with respect to mirror 12 so that when rotor 3 is in a normal unoperated position, a spot of light is focused on the sensitive portion of the photoelectric cell.

The magnetic yoke 34 and magnetic cores 37, 38 are of low loss magnetic material having high permeability such as powdered iron composition or ferrite. Serially-connected stator windings 10 and 11 and rotor winding 3 are designed to operate effectively the chosen I.-F. frequency, for example, 455 kc. In order to provide an electrical shield the entire assembly may be fitted with a metallic cover.

For delaying the I.-F. signal, an electrical filter may be substituted for mechanical filter 7, but a mechanical filter as described in United States Patent 2,717,361, issued to Melvin L. Doelz, is preferred. The 90° phase shift network and the D. C. amplifiers may be the conventional types. I.-F. amplifier stages 8 and 23 serve not only to amplify a signal, but serve as buffers between the stator and rotor windings of the motors.

Different modifications of the circuit shown in Figure 1 may readily be suggested. For example, one photoelectric cell, amplifier, and one squelch relay may be used in place of the duplicated parallel circuits shown. Mirrors 12 and 27 would then be arranged to control one beam of light. When the mirrors are in normal positions the light would converge upon the single photoelectric cell.

The invention as described above is particularly well adapted for use in circuits of communication receivers that are used constantly, such as in certain radio relay circuits. When the rotor windings and the mirrors of the motors are designed to have small rotational inertia, the squelch device will respond quickly to enable the receiver when repetitive signals are being received, and to disable the receiver when non-repetitive signals are being received. In this manner non-repetitive signals which are heard as noise are positively eliminated. An advantage of this squelch device over certain other mechanical squelch devices is that the receiver is abruptly enabled or disabled so that there are no intermediate positions in which the receiver is partially disabled.

This invention, which shows utilization of photoelectric devices in a squelch system, may be modified and still be within the full intended scope of the invention as defined in the appended claims.

I claim:

1. In a squelch device for a radio receiver, an electromechanical actuator having a yoke of low-loss highly permeable magnetic material, a pair of axial pole pieces extending inwardly from said yoke, a stationary winding being disposed on each of said pole pieces, a rotor winding, a shaft secured to said rotor winding for rotatably supporting said rotor winding between said pole pieces, a mirror securely mounted on said shaft; means for applying signal to said rotor winding, means for changing phase of said signal and for applying the signal of different phase to said stationary windings, a mechanical stop for stopping rotation of said rotor winding and associated mirror in a particular position, spring biasing means for positioning said rotor winding in a normal position away from said stop, said rotor winding being operated against said spring means in response to application of repetitive signal to said windings thereby to position said rotor winding and said mirror in said particular position, said rotor winding being operated away from said particular position by said spring biasing means when signal applied to said windings is non-repetitive; a photoelectric system including a source of light, a photoelectric cell, means responsive to the operation of said photoelectric system for enabling receiving circuits, said mirror, said source of light, and said photoelectric cell being arranged so that movement of said mirror controls said system, and said system operated in response to positioning said mirror in said particular position to enable said receiving circuits.

2. In a radio receiving system including a radio-frequency amplifier circuit and an output circuit, a mechanical squelch system having in combination a signal-operated motor and a photoelectric system for controlling application of signal to said output circuit, said motor having a staitonary field winding and a rotor winding rotatably supported adjacent said field winding, a signal delay circuit, said radio-frequency amplifier being connected directly to one winding of said motor and being connected through said signal delay circuit to the other one of said windings, output control means operable for enabling said output circuit, said photoelectric control system having light control means responsive to the operation of said motor, said motor operating in response to the application of repetitive signals to said amplifier circuit, and said photoelectric system responsive to the operation of said motor to operate said output control means.

3. In a radio receiving system including a radio-frequency amplifier and an output circuit, a squelch system comprising the combination of first and second signal-controlled motors and a photoelectric control circuit, first and second phase-shifting circuits, each of said motors having a stationary winding and a rotary winding, said amplifier being connected directly to one winding of each of said motors, said amplifier also being connected to the other winding of said first motor through said first phase-shifting circuit and to the other winding of said second motor through both said first and second phase-shifting circuits, output control means for enabling said output circuit, said photoelectric control system having light control means responsive to the operation of either one of said motors, each of said motors operating in response to the application of repetitive signals of predetermined phase relations to said amplifier, and said photoelectric system responsive to the operation of either of said motors to operate said output control means.

References Cited in the file of this patent

UNITED STATES PATENTS

| | | |
|---|---|---|
| 1,503,318 | Grondahl | July 29, 1924 |
| 1,736,500 | Legg | Nov. 19, 1929 |
| 1,848,220 | Lindsay | Mar. 8, 1932 |
| 2,139,057 | Brockstedt | Dec. 6, 1938 |
| 2,151,170 | Tellegen et al. | Mar. 21, 1939 |
| 2,710,943 | Doelz | June 14, 1955 |